US00RE36743E

United States Patent [19]

Ripka

[11] E Patent Number: Re. 36,743

[45] Reissued Date of Patent: Jun. 20, 2000

[54] PRE-MIX FLAME TYPE BURNER

[75] Inventor: Chester D. Ripka, East Syracuse, N.Y.

[73] Assignee: Carrier Corporation, Syracuse, N.Y.

[21] Appl. No.: 08/629,329

[22] Filed: Apr. 8, 1996

Related U.S. Patent Documents

Reissue of:

[64] Patent No.: 5,458,484
Issued: Oct. 17, 1995
Appl. No.: 08/243,353
Filed: May 16, 1994

[51] Int. Cl.[7] ..... F23D 14/82

[52] U.S. Cl. ..... 431/353; 431/329; 431/346; 431/328; 126/109; 126/116 R

[58] Field of Search ..... 431/353, 329, 431/346, 354, 348, 328; 239/403; 126/109

[56] References Cited

U.S. PATENT DOCUMENTS

| | | | |
|---|---|---|---|
| 3,099,258 | 7/1963 | Kurz | 431/329 X |
| 3,122,197 | 2/1964 | Saponara et al. | 431/329 |
| 3,322,179 | 5/1967 | Goodell | 431/329 X |
| 3,324,924 | 6/1967 | Hailstone et al. | 431/328 |
| 3,525,325 | 8/1970 | Perl | 126/39 |
| 3,936,003 | 2/1976 | Hapgood et al. | 239/559 |
| 4,012,189 | 3/1977 | Vogt et al. | 431/353 |
| 4,472,136 | 9/1984 | Lefebure | 431/329 X |
| 4,631,023 | 12/1986 | Couurrege | 431/346 X |
| 4,645,451 | 2/1987 | Schneider et al. | 431/278 |
| 4,886,446 | 12/1989 | Courrege | 431/329 |
| 4,919,609 | 4/1990 | Sarkisian et al. | 431/7 |
| 4,960,102 | 10/1990 | Shellenberger | 126/110 R |
| 5,060,629 | 10/1991 | Sirand | 126/92 B |
| 5,201,650 | 4/1993 | Johnson | 431/9 |
| 5,203,689 | 4/1993 | Duggan et al. | 431/114 |
| 5,370,529 | 12/1994 | Lu et al. | 431/326 X |

OTHER PUBLICATIONS

American Society of Heating, Refrigerating and Air–Conditioning Engineers, Inc. Dec. 1992 Ashrae Heating, Ventilating and Air–Conditioning Systems and Equipment Handbook, 15.1–15.3 (Atlanta) Dec. 1992.

*Primary Examiner*—Larry Jones

[57] ABSTRACT

A burner for burning a combustible gas comprising fuel gas and air that has been mixed before being supplied to the burner. The burner has a flame holder [concavely] *axially and radially* recessed into a flame outlet. The [concave] configuration of the flame holder focuses the individual flames on the combustion surface toward a central location where the individual flames interact with and reinforce one another in a direction axial to the burner. Thus very little heat is transmitted directly from the burner in a direction normal to the burner axis. This characteristic of the burner allows it to be used to fire a flue type heat exchangers where the walls of the heat exchanger are very close to the burner without excessive temperatures being produced in the heat exchanger walls adjacent the burner.

6 Claims, 3 Drawing Sheets

PRE-MIX FLAME TYPE BURNER

Matter enclosed in heavy brackets [ ] appears in the original patent but forms no part of this reissue specification; matter printed in italics indicates the additions made by reissue.

BACKGROUND OF THE INVENTION

This invention relates generally to burners for burning a combustible gas comprised of a mixture of fuel gas and air. More particularly, the invention relates to a burner of the pre-mix type where the mixing of the fuel gas and air has occurred before the combustible gas reaches the burner.

Burners for burning a combustible gas find use in a wide variety of applications. One use is in hot air furnaces, where the burning gas heats air for the purpose of warming the interior of a building such as a house. In such a furnace, the burning gas and gases of combustion are confined with a heat exchanger, such as heat exchanger 50 in FIG. 1, while air to be heated passes over and around the exterior of the heat exchanger. Heat exchanger 50 is of the clamshell type and is typical of the heat exchangers found in residential warm air furnaces. Such a heat exchanger is manufactured by embossing two matching raised patterns into sheet metal and joining the embossed patterns together to form heat exchanger flue path 51. The joints are made so that flue path 51 is gas tight except for flue inlet 52 and flue outlet 53. The typical furnace has more than one heat exchanger, the number being dependent on the size and heat transfer characteristics of each individual heat exchanger and the desired furnace heating capacity. Other furnace structure isolates the flue inlets and outlets from the air to be heated. Other furnace designs use tubular heat exchangers such as heat exchanger 60 shown in FIG. 2. Heat exchanger 60 is functionally similar to heat exchanger 50 in that air to be heated passes around the exterior of flue 61 and the burning gas and gases of combustion are confined to the interior of the flue path between flue inlet 61 and flue outlet 62.

In the typical prior an hot air furnace, an inshot burner, such as burner 30 depicted schematically in FIG. 3, burns fuel gas and air to produce hot gases of combustion. Fuel gas is supplied to burner 30 through gas inlet 32. Air, introduced through primary air inlet 36, mixes with the fuel gas and burns, producing primary flame 33. Other air, known as secondary air, mixes with the unburned gas in primary flame 33 and produces secondary flame 34. The result is that the total length of flame from an inshot burner is relatively long. An inshot burner is positioned at the flue inlet, such as flue inlet 52 (FIG. 1) or flue inlet 62 (FIG. 2), of each heat exchanger in the furnace so that the flame projects into the heat exchanger flue.

The combustion of a fuel gas such as methane, particularly at very high temperatures can produce, as products of combustion, various oxides of nitrogen, collectively known as $NO_x$. These oxides vent to the atmosphere with other combustion products. Limiting the concentration of $NO_x$ [in] *is* desirable, as certain [jurisdiction] *jurisdictions* may place restrictions on $NO_x$ emissions. Furnaces sold in those jurisdictions must comply with very stringent emission standards.

Furnace designers have found that the use of pre-mix burners can greatly reduce $NO_x$ emissions. Unlike an inshot burner, where fuel gas and air mix in the burner, the fuel gas and air are mixed to form a combustible gas at a point in the fuel gas and air supply paths before reaching the pre-mix burner. FIG. 4 depicts schematically a typical prior art pre-mix burner. Burner 40 has burner body 41, combustible gas inlet 42 and flame holder 44. Flame holder 44 is perforated so that combustible gas can pass through the holder and burn as flames 49 slightly off its surface. In such a burner as burner 40, the flames, and thus the heat output, are concentrated in the immediate vicinity of the burner.

A pre-mix burner having physical and operating characteristics similar to burner 40 would not be suitable for use with a heat exchanger such as heat exchanger 50 or 60. The heat exchanger wall would necessarily be in close proximity to the burner and thus the concentration of the heat produced in the immediate vicinity of the burner would result in excessively high temperatures in the wall of the heat exchanger. Such high temperatures would increase surface temperatures of the surrounding heat exchanger and shorten the life of the heat exchanger. U.S. Pat. No. 4,960,102, issued 2 Oct. 1990 to Shellenberger, describes and depicts a furnace having a burner like burner 40. The furnace avoids the problem of excessive temperatures in the heat exchanger wall by constructing the wall to be sufficiently far from the burner that excessive temperaures do not occur.

The figures of U.S. Pat. No. 3,525,325, issued 25 Aug. 1970 to Perl, appear to disclose a gas flame burner having a concave flame holder but a close reading of the disclosure shows that the '325 burner is of the radiant infrared and not of the flame type.

Clamshell and tubular type furnace heat exchangers offer a number of operational, cost and manufacturing advantages. Large numbers are in use and they are still in production. What is needed is a burner of the pre-mix type, with its low $NO_x$ emission qualities, that can be used with a clamshell or tube type heat exchanger. Such a burner should not have combustion characteristics that would lead to excessive heat exchanger wall temperatures, even if the wall is in close proximity to the burner.

SUMMARY OF THE INVENTION

The present invention is a burner of the pre-mix type in which a combustible gas, comprised of a mixture of fuel gas and air, is burned. The physical configuration of the burner affects the flame that it produces so that excessive temperatures in the immediate vicinity of the burner are avoided. It is thus possible to use the burner in conjunction with a clamshell or tubular type heat exchanger with little or no modification to the heat exchanger.

The burner has a flame outlet having a flame holder [concavely]*which is axially and radially* recessed into the outlet. The [concavity] *shape* of the flame holder causes the individual flames produced on the flame holder to be directed to a central focus, where they reinforce each other and combine to produce a flame that is projected along an axis normal to the plane of the flame outlet for some distance from the burner. In this way, the heat produced by the flame is distributed over a greater distance than is possible with prior art pre-mix burners. It is this distribution of heat in an extended flame downstream of the burner that allows the burner to be used with clamshell and tubular heat exchangers.

BRIEF DESCRIPTION OF THE DRAWINGS

The accompanying drawings form a part of the specification. Throughout the drawings, like reference numbers identify like elements.

DESCRIPTION OF THE PREFERRED EMBODIMENT

Figure 5A:
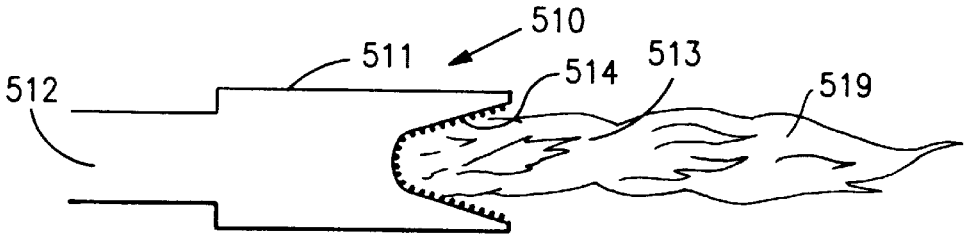
FIGS. 5A and 5B are respectively a schematic view and an isometric view, partially broken away, of one embodiment of the burner of the present invention.
Figure 5B:
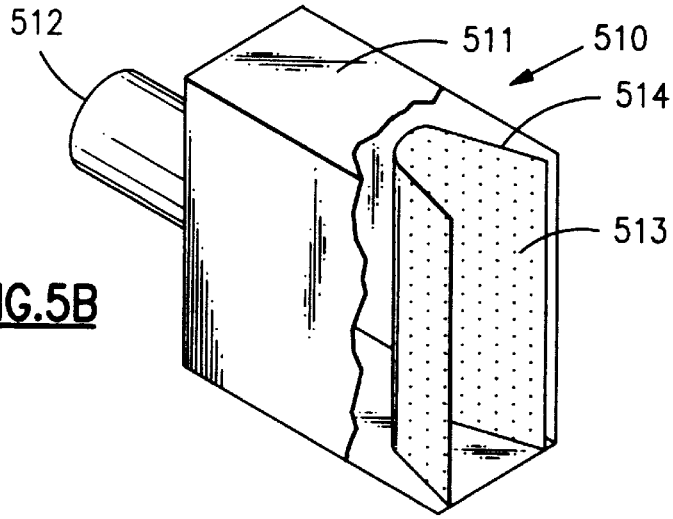

Burner 510, shown in FIGS. 5A and 5B, is one embodiment of the present invention. Combustible gas flows into rectangular burner body 511 through combustible gas inlet 512. The gas flows through flame holder 514 by means of a number of perforations. During burner operation, combustion of the gas occurs on the outer or downstream face of flame holder 514. The entire surface of flame holder 514 contains perforations.

Figure 8:
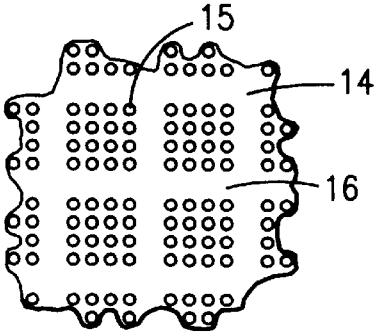
FIG. 8 is a view of a portion of the flame holder of the burner of the present invention.

FIG. 8 depicts one satisfactory arrangement of perforations, with groups of perforations 14 separated by imperforate zones 16. U.S. Pat. No. 4,397,631, issued 9 Aug. 1983 to Fisher, fully discloses and discusses the reasons for and advantages of such an arrangement.

Combustion occurs at each perforation in flame holder 514. Because flame holder 514 is configured to [concavely] *axially and radially* recess into burner body 511 from burner outlet 513, individual flames are directed inward toward a central focus where they combine and reinforce and are projected out of burner outlet 513 in a direction normal to the plane of outlet 513.

FIGS. 6A and 6B and 7A and 7B depict other embodiments of the present invention. Burners 616 and 710 differ from burner 510 primarily in the shapes of their respective burner bodies 611 and 711 and in the configurations of their respective flame holders 614 and 714. The shape of burner 610 would make it suitable for use with a tubular heat exchanger while the shapes of burners 510 and 710 are adapted for use with a clamshell type heat exchanger. The oval shape of burner body 611 offers no operational advantage over the rectangular shape of burner body 510 but burner 710 may offer increased life as compared to burner 510 because it does not have square corners. These corners could increase the thermal and physical stresses present in burner body 511.

Figure 1:
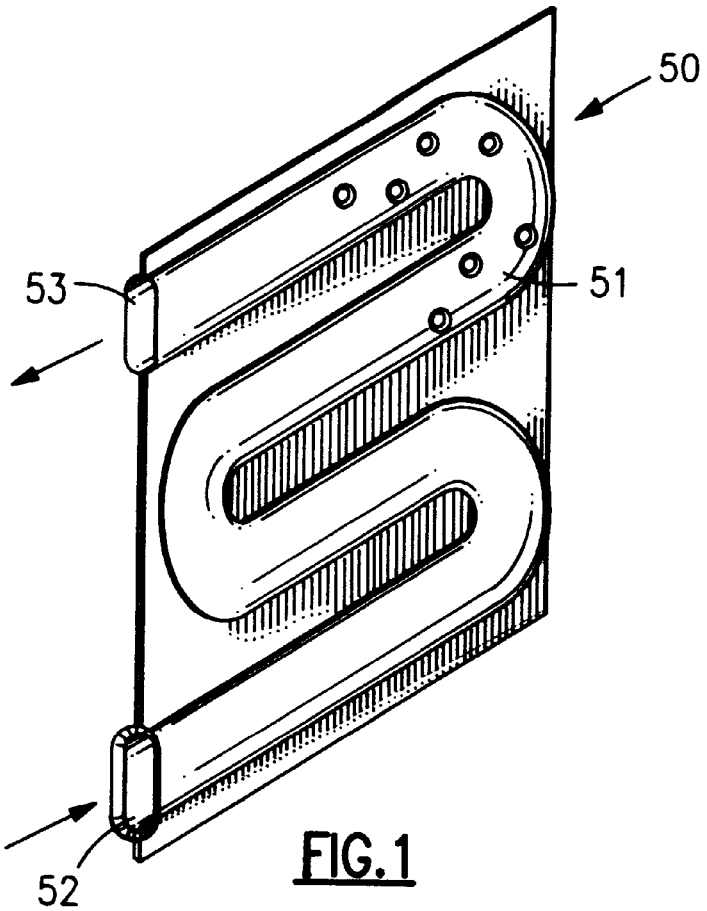
FIG. 1 is a view of a clamshell heat exchanger.
Figure 2:
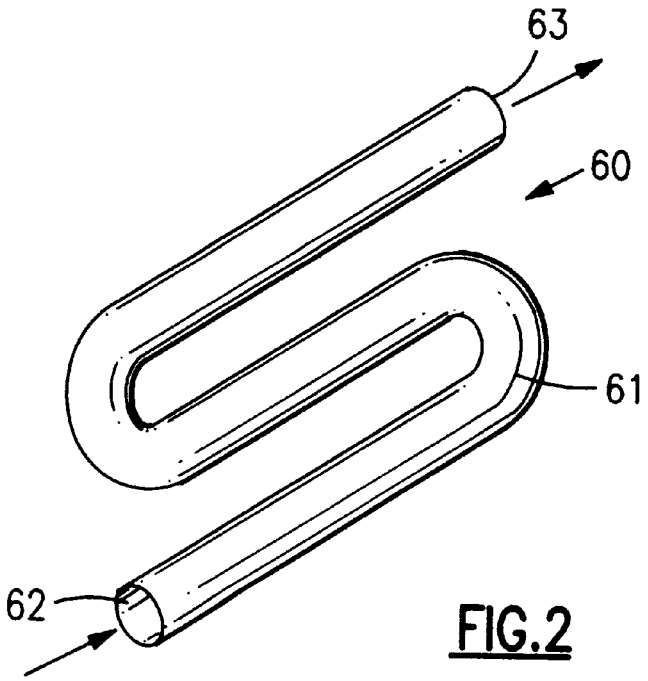
FIG. 2 is a view of a tubular heat exchanger.
Figure 3:
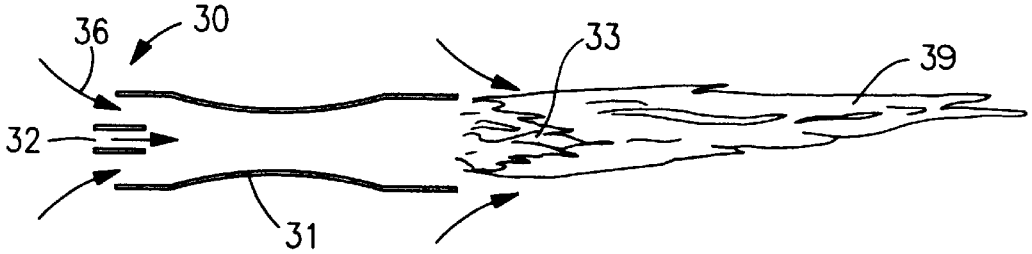
FIG.3 Prior Art
FIG. 3 is a schematic view of an inshot type burner.
Figure 4:
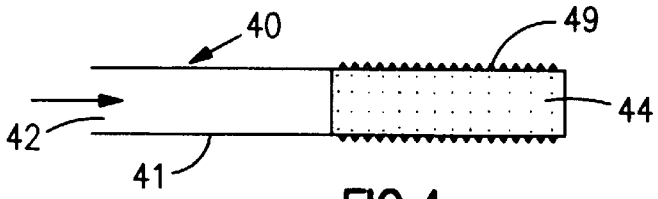
FIG.4 Prior Art
FIG. 4 is a schematic view of a prior art pre-mix burner.
Figure 7A:
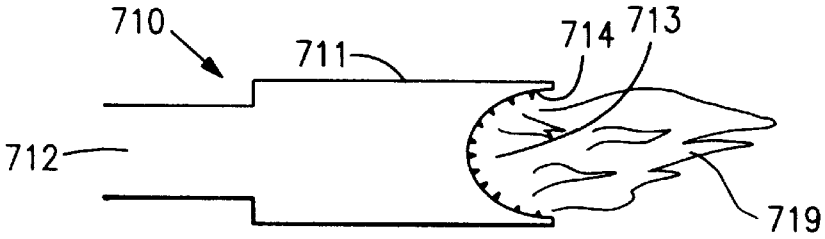
FIGS. 7A and 7B are respectively a schematic view and an isometric view, partially broken away, of another embodiment of the burner of the present invention.
Figure 7B:
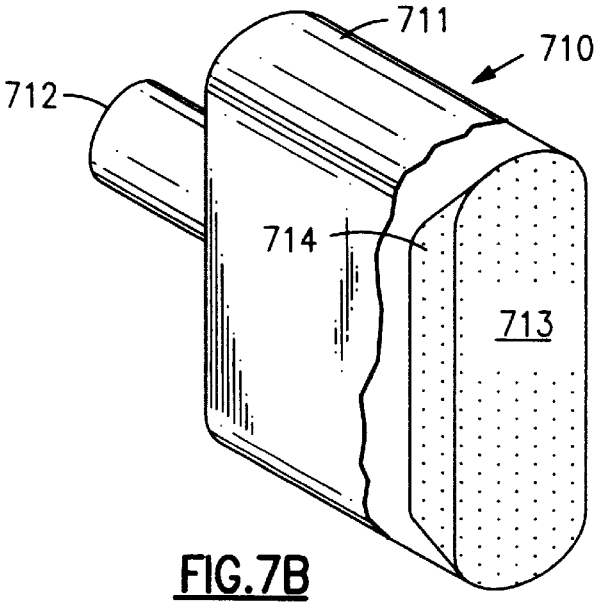
Figure 6A:
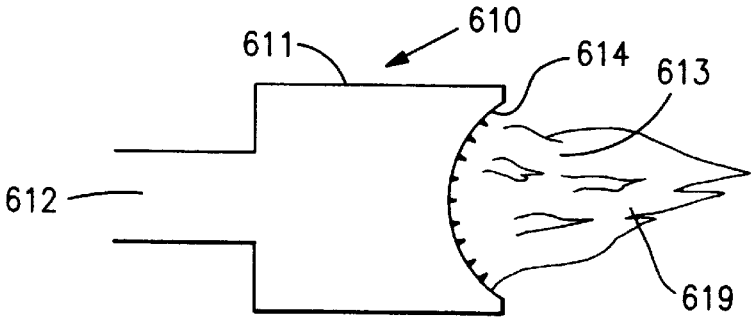
FIGS. 6A and 6B are respectively a schematic view and an isometric view, partially broken away, of another embodiment of the burner of the present invention.
Figure 6B:
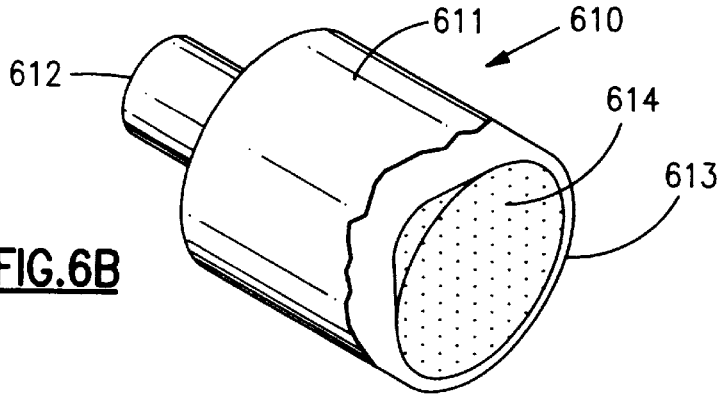

Theoretical work confirmed by experiments indicate that the precise [concave] shape of flame holders 514, 614 and 714 is not critical. FIG. 5A depicts a flame holder having one axial cross section that is comprised of an arc of a circle and straight lines. FIG. 6A depicts a flame holder having [a] *an axial* cross section that is the arc of a circle. And FIG. 7A depicts a flame holder having an elliptical cross section. Any of these shapes should provide satisfactory performance. It is merely necessary to have a shape that directs the individual flames on the outer surface of the flame holder toward a central focus.

I have built and tested a prototype of the burner of the present invention. During bench operational testing at full burner feed rate, it is possible for one to hold a hand within two centimeters of the burner body continuously with only a slight increase in temperature detectable. This is because the combined flame and resultant heat from the burner is projected downstream from the burner outlet. In addition, the unignited and relatively cool combustible gas entering the burner body serves to remove heat from the burner body wall.

I claim:

1. A flame type burner (510, 610, 710) for burning a combustible gas comprising:

a burner body (511, 611, 711);

a combustible gas inlet means for mixing a fuel gas and air and conveying it (512, 612, 712) into said burner body;

a flame outlet (513, 613, 713) from said burner body; and a perforated flame holder (514, 614, 714) having a combustion surface that is [concavely] *axially and radially* recessed into said flame outlet and that directs flames toward a central focus.

2. The burner of claim 1 in which said flame holder is comprised of a single thickness of a single material.

3. The burner of claim 1 in which at least one *portion of an axial* cross section of said flame holder is a [segment of an parabola] *straight line*.

4. The burner of claim 1 in which at least one *axial* cross section of said flame holder is a segment of an ellipse.

5. The burner of claim 1 in which at least one *axial* cross section of said flame holder is an arc of a circle.

6. A flue gas-to-fluid heat exchanger (50, 60) and flame type burner (510, 610, 710) assembly comprising:

a flue gas-to-fluid heat exchanger having a flue inlet (52, 62); and a flame type burner, positioned at said flue inlet, having a burner body (511, 611, 711);

a combustible gas inlet means for mixing a fuel gas and air and conveying it (512, 612, 712) into said burner body;

a flame outlet (513, 613, 713) from said burner body; and a perforated flame holder (514, 614, 714) having a combustion surface that is [concavely] *axially and radially* recessed into said flame outlet and that directs flames toward a central focus.

* * * * *